US006108584A

United States Patent [19]

Edwards

[11] Patent Number: 6,108,584

[45] Date of Patent: Aug. 22, 2000

[54] MULTICHANNEL DIGITAL AUDIO DECODING METHOD AND APPARATUS

[75] Inventor: Owen R.G. Edwards, San Jose, Calif.

[73] Assignees: Sony Corporation, Tokyo, Japan; Sony Electronics Inc., Park Ridge, N.J.

[21] Appl. No.: 08/890,049

[22] Filed: Jul. 9, 1997

[51] Int. Cl.[7] .............................. G06F 17/00; H04R 5/00

[52] U.S. Cl. .............................................. 700/94; 381/22

[58] Field of Search .............................. 700/94; 704/500, 704/501; 381/22

[56] References Cited

U.S. PATENT DOCUMENTS

| | | | |
|---|---|---|---|
| 5,524,054 | 6/1996 | Spille | 381/18 |
| 5,835,375 | 11/1998 | Kitamura | 700/94 |
| 5,893,066 | 4/1999 | Hong | 704/500 |
| 5,920,353 | 7/1999 | Diaz et al. | 348/402 |
| 5,955,746 | 9/1999 | Kim | 257/69 |

OTHER PUBLICATIONS

International Organisation for Standardisation ISO/IEC JTC1/SC29/WG–11 N1519 "Information Technology—Generic Coding of Moving Pictures and Audio: Audio" pp. v–x, 54–59, 69–70, Feb. 20, 1997.

*Primary Examiner*—Forester W. Isen
*Assistant Examiner*—Brian Tyrone Pendleton
*Attorney, Agent, or Firm*—Wood, Herron & Evans, L.L.P.

[57] ABSTRACT

In digital audio decoding, the compressed data of the first two channels of a frame of MPEG multichannel audio are received, parsed and stored in plural spaced sub-blocks of buffer memory. Then, coding information of the same frame is received and interpreted. If the signal includes MPEG-2 multichannel audio, then compressed data of the remaining channels of the frame are received, parsed and interleaved in the sub-blocks. The sub-blocks are read from the buffer and decoded, sub-block by sub-block, transformed into decoded output data of all of the channels for simultaneous output to output devices. Less than 8K-bits read to local memory can be decoded to produce full multiple channel output. A memory controller accesses non-contiguous areas of the buffer memory and reads and writes differing sizes of data blocks. Substantial savings in both on and off chip memory are provided.

20 Claims, 4 Drawing Sheets

MULTICHANNEL DIGITAL AUDIO DECODING METHOD AND APPARATUS

The present invention relates to digital audio decoding, and more particularly, to a multiple channel audio decoder implementation for the reproduction of sound in receiver systems from digital signals, such as broadcast television and other signals utilizing digital multiplexing and compression.

BACKGROUND OF THE INVENTION

Recent times have seen an acceleration in efforts by suppliers of consumer electronics to greatly expand the amount and quality of information provided to users. The expanded use of multimedia information in communications and entertainment systems along with user demands for higher quality and faster presentations of the information has driven communications and entertainment industries to seek systems for communicating and presenting information with higher densities of useful information. These demands have stimulated the development and expansion of digital techniques to code and format signals to carry the information.

Unlike most of the communication systems of the past, particularly television broadcast systems and other systems used for home entertainment, where analog signals have filled available bandwidths with single program real time signals in a straight forward format that includes much redundant and humanly imperceivable information, digital transmission systems possess the ability to combine and identify multiple programs and to selectively filter certain redundant or otherwise useless information to provide capabilities for the transmission of programs having higher quality and information carrying ability. As a result of the high technological demand for such capabilities, advances toward the specification and development of digital communications formats and systems have accelerated.

MPEG-1

In furtherance of these advances, the industry sponsored Motion Pictures Expert Group (MPEG) has specified a format for the encoding of multimedia programs referred to as MPEG-1, and, more formally, as ISO-11172. MPEG-1 defines a group of essentially three techniques, one for compressing digitized audio consisting of one (mono) or two (stereo) channels of sound (ISO/IEC 11172-3, section 3 of the MPEG-1 standard), another for compressing digital video (ISO/IEC 11172-2, section 2 of the MPEG-1 standard), and another for combining the compressed streams of audio and video into storage (e.g. CD-ROM) or transmission (e.g. digital satellite television) systems (ISO/IEC 11172-1, section 1 of the MPEG-1 standard), such that they can be treated as a single stream of data but still separated and decoded properly.

The overall MPEG-1 specification is targeted at digital storage media applications, typically with bit-rates up to 1.5 Mbits/second, such as could be obtained from a CD. The resulting picture and sound quality of MPEG-1 systems was anticipated to be below that of regular broadcast television or VHS playback. In certain configurations, the data can be played back on a personal computer using only software programs to decode the video and audio, although both sections of the standard allow for more complicated methods of compression, which require dedicated hardware to decode but deliver higher quality or more compression.

The audio standard, part three of MPEG-1, specifies the decoding process for one or two channel audio, which can carry monaural, stereo or two multi-lingual channels. For stereo digital recording, for example, MPEG-1 specified for a stream of data of a particular format containing a series of interleaved pairs of samples representing a left channel and a right channel. As a result, in the basic two channel MPEG-1 compatible data stream, where the transformed and compressed samples are encoded alternately for each channel and grouped into relatively large frames, typically 1152 samples per channel, only 32 samples of each of the two channels need be read, stored and processed in the decoder at a given time in order to produce decompressed audio samples for output to the required channels at the required presentation rate.

A variety of compression schemes are possible in both MPEG-1 and MPEG-2. Both MPEG-1 and MPEG-2 audio, for example, provide three compression techniques, referred to as "layers", of increasing compression quality and decoder complexity. Layer I and Layer II, the two simpler compression schemes, are typically used for consumer broadcast and storage applications, while Layer III is usually reserved for professional or special applications. The above described data features are for typical Layer II coding but most are generally common to each of these schemes. The 1152 samples per channel per audio frame referred to above is a specific feature of Layer II audio compression, which is three times the 384 samples per channel per frame for Layer I compression. Layer II is the compression method usually used in DTV and other consumer applications.

MPEG-2

MPEG-2 is designed to extend the techniques of MPEG-1 to give a quality at least as good as VHS, and potentially approaching that of a movie theater, as well as the ability to transmit or store more than one program in a single data stream. Specifically in the audio section, MPEG-2 provides for methods to encode more than two audio channels to give surround sound playback, which is typically configured as six channels, such as front left, front right, front center, rear left, rear right and a Low Frequency Effects channel, although other combinations of up to six channels are possible.

The coding of the Low Frequency Effects (LFE) channel, if present, in the surround combinations uses greater compression because of its limited audio bandwidth, which is 125 Hz rather than about 20 kHz. As a result, the LFE channel represents a much smaller proportion of the data stream than the other channels, and is often omitted from diagrams of the stream. Because of the limited bandwidth of the LFE channel, the surround channel combination that includes the LFE channel is commonly referred to as 5.1 channel, rather than 6 channel, audio.

In addition, the MPEG-2 audio standard (ISO/IEC 13818-3) provides "backward compatibility", so that if an MPEG-2 audio data stream is fed into an MPEG-1 audio decoder, a reasonable combination of the surround channels which were encoded into the stream will be decoded to the two outputs. This is possible because the MPEG-1 audio standard makes provision for "ancillary data" to be inserted into the compressed stream, which the decoder must be able to ignore or discard. The extra information for the additional channels in the MPEG-2 audio stream appears to an MPEG-1 decoder as this "ancillary data".

Bitstream Structure

The MPEG-1 bitstream may be viewed as bitstream 10, illustrated diagrammatically in FIG. 1, which is formatted to carry one or more frames 11 of audio data. A frame of audio data includes 1152 samples per channel, at a sampling rate of, for example, 48 kHz, for 24 msec of audio per frame.

These MPEG-1 audio frames each include a header 12 of, for example, 32 bits of identifying and coding data, followed by an audio data stream 16 in which interleaved pairs of 1152 frequency domain compressed samples of data representing each of two possible channels 1 3 and 14, for example for left channel stereo and right channel stereo, are encoded, as illustrated in FIG. 1A. Sequential groups or "turns" of frequency domain data samples n, for each channel 13,14, are decodable into time domain digital representations of sound in two stereo channels. The data samples are encoded in frequency subband blocks and samples of, for example, 32 frequency subbands m, for each of a plurality of, for example, 12 groups, and with, for example, one to three samples each, depending on the compression layer selected by the program transmitter. Following the audio data stream, MPEG-1 provides for the inclusion of ancillary data in an ancillary data field 15, which MPEG-1 processors might or might not ignore. The specified MPEG-1 audio standard is set forth in detail in ISO/IEC 11172-3, "Coding of Moving Pictures and Associated Audio for Digital Storage Media at up to about 1.5 Mbits/s—Part 3: Audio." ISO/IEC JEC 1/SC 29, expressly incorporated herein by reference.

A frame of MPEG-2 multichannel audio follows the format of MPEG-1 audio frames, with the additional data of the MPEG-2 data stream replacing or augmenting the ancillary data field 15 at the end of the MPEG-1 audio data frame 11. This additional information includes a leading header of identifying fields and fields of additional channel data, collectively referred to as the mcml_extension( ). The leading header fields include control or ID information that will inform an MPEG-2 decoder of the nature and format of the data that follows. The data streams that follow are multichannel audio data streams and/or multi-lingual audio data streams.

An MPEG-2 program bitstream 20 that includes an MPEG-2 audio data frame 21 is diagrammatically represented in FIG. 2, as including components corresponding the MPEG-1 audio frame 11. Its components include header 12, the stream of channel 1 & channel 2 data 16 and a data stream occupying the ancillary data field 15. The ancillary data stream field 15 includes a data stream 17 of audio data representing audio channels 3 through 6. The data 17 includes data 13 that can be reproduced by an MPEG-1 decoder to produce output for a left channel stereo and data 14 that can be reproduced by an MPEG-1 decoder to produce output for a right channel stereo. At the beginning of the ancillary data field 15 is included a multichannel identifying and coding information field 22.

The data stream 17 includes 1152 samples per channel per frame of, for example, the three additional channels 3 through 5 of audio data 23, 24 and 25, respectively. The audio data for the additional channels is also coded in corresponding samples i, 1152 samples per frame 21, with each sample coded in 32 frequency domain sub-blocks k, as illustrated in FIG. 2A.

Fields of other data 25 the audio data may follow the data 23–25 in the ancillary data field 15. The specified MPEG-2 audio standard is set forth in detail in ISO/IEC 13818-3, "Generic Coding of Moving Pictures and Associated Audio Information—Part 3: Audio." ISO/IEC JEC 1/SC 29, expressly incorporated herein by reference. An explanation of the MPEG audio standards, including the syntax and semantics of the MPEG signals, can be found in Haskell et al., Digital Video: *An Introduction to MPEG*-2, Chapman & Hall, NY, N.Y., 1997, particularly chapter 4 thereof.

The three streams of audio data 23–25 for the additional three channels may typically represent, for example, three additional channels of surround sound audio: a front-center channel, a surround-right channel and a surround-left channel. However, the first two channels of a five channel surround system usually do not ideally reproduce a stereo sound where the program is encoded in multiple channels for surround sound or some other multichannel reproduction. Therefore, to make five channel sound backward compatible with MPEG-1 two channel stereo (and for other reasons such as compression and coding efficiency), linear combinations of the five surround channels are often transmitted instead of the separate streams which each separately and fully encode each of the five input channels. The combinations are formed by multiplying the five input signals by a 5×5 or other appropriate transformation matrix. Therefore, when reproduced by an MPEG-1 decoder, without employing an inverse matrix transformation that would be employed by an MPEG-2 decoder, the first two channels so reproduced will result in a better rendition of two channel stereo when decoded with a decoder of an MPEG-1 system. However, following an inverse matrix transformation by an MPEG-2 decoder, the first two channels of a five channel program are reproduced in the left and right front channels of the five channel system, while regenerated sound of center and left surround and right surround channels are output by corresponding channels of the five channel surround system.

As suggested above, notwithstanding a consideration of backward compatibility with MPEG-1 systems, it is usually not desirable to encode five channels of surround audio totally separately, since coding efficiency can be increased by eliminating redundancies between channels by encoding common components in the first two channels and coding difference components only for the other three channels. As a result the transformed coding scheme, an MPEG-1 system reproduces virtually all of the audio program by decoding the first two channels, while the MPEG-2 system constructs the other three channels by copying parts of their streams from other channels, particularly from channels one and two, using any of a number of decoding algorithms, including those required to reverse the compression, predictive and other coding schemes used by the encoder of the transmitter. An MPEG-2 program, so encoded, contains information in data 21 that identifies the coding scheme employed, so that decoding of the program can be properly implemented by the receiver. This identifying data and the audio data for the additional channels will appear, in an MPEG-2 signal, in place of an ancillary data stream at the end of what is otherwise a valid MPEG-1 audio stream.

The matrixed coding discussed above imposes decoding requirements on an MPEG-2 receiver, since the data to the additional channels, and in most cases also the data to the two front stereo channels, must be completely available to the decoder before any output to the channels can be produced. That is to say, outputting of the first data to a channel must await receipt and processing of data from near the end of the bitstream of the input signal.

Backward Compatibility

For backward compatibility of MPEG-2 audio with MPEG-1 decoders, the program bitstream of an MPEG-2 signal, along with fields of appropriate identifying and coding information, is encoded in a format that is reproducible by an MPEG-1 decoder, with the additional channels that make up MPEG-2 audio being encoded into the MPEG-1 ancillary data field, where it can be ignored by an MPEG-1 decoder. However, the provision for backward compatibility increases the difficulty of the task of the MPEG-2 decoder to reproduce five or six channel sound.

The difficulty arises in part from the fact that the compressed data for the third through sixth channels follow, and are received by an MPEG-2 receiver, after the receipt of the entire frame of compressed samples for the first two channels. As a result, in order to produce decoded samples for all channels, it is necessary to read and store all 1152 compressed samples for the first two channels before it is possible to even start to read the data for the other channels.

A straight forward method of decoding an MPEG-2 multiple channel audio program of more than two channels is to read all of the audio data of a given frame into memory, or at least the audio data streams for the first two channels, then decoding the data for sequential output to all of the channels. To accomplish this requires the use of local memory in the decoder chip, or Static Random Access Memory which memory is typically of the type referred to as SRAM. This active, random access volatile memory provides the speed necessary for such a matrix transforming operation, but it is very expensive to provide such SRAM in the large quantity needed to effectively handle the data needed to decode the additional channels.

Because an MPEG-1 or MPEG-2 audio decoder can take a variable amount of time and occasionally more than the length of time between the playback of successive samples to decode a single sample for each channel, it is common to run the decoder ahead of the playback scheme and to store the pre-decoded samples in memory so that they are available for playback as required. In a combination video and audio decoder, it is further necessary to consider synchronization between the displayed video and audio, sometimes referred to as "lip-sync". Typically, a much larger buffer of pre-decoded samples stored in memory is employed. In this way, samples can be discarded without being played in order to speed up the audio and bring it into synchronization with the video. Still, current approaches to the storing of a large number of pre-decoded audio samples are unacceptably costly.

Further, the approach of writing the received audio data to an external buffer of DRAM or other lower cost memory does not provide the computational performance or speed that is required where the stored data must be accessed out of the order in which it is stored and repetitive reads and writes are required.

In addition, in some applications, the audio decoder cannot be told by the controller at the system level whether the incoming data stream is MPEG-1 or MPEG-2. Therefore, the decoder must detect the MPEG standard of the incoming stream from the data stream itself. In such a case, before possessing the information needed to determine the MPEG standard being used, the decoder will already have read and at least partially decoded and stored the information relating to channels 1 and 2, and will be in the process of reading the ancillary data field that would contain information for channels 3–5, particularly the headers thereof. If the data stream is then discovered to be MPEG-1, which is first learned by the decoder when it finds that the ancillary data field does not contain an MPEG-2 header or any other information on channels 3-5, the stored data could be in the wrong layout for decoding as MPEG-1 stereo.

For the reasons set forth above, there is a need for a multichannel audio decoding method and apparatus that can rapidly and effectively decode audio data for individual audio channels from the data streams of more than one audio channel, and to do so with low and inexpensive memory requirements.

SUMMARY OF THE INVENTION

A primary objective of the present invention is to provide efficient and effective decoding of digital data of audio channels from the audio data streams of other channels. It is also an objective of the present invention to provide for the decoding of audio data for one or more data channels from the data streams of two or more channels sequentially encoded in a common bitstream of data.

A further objective is to provide for the decoding for audio reproduction of plurality of audio channels, such as those encoded into data streams according to MPEG-1 or MPEG-2 data formats, where at least some of the channel outputs must be decoded from data of a plurality of data channels of the received data stream, without substantial time delays or without high local memory requirements. A particular objective of the present invention is to provide for the efficient decoding the additional channels of multichannel audio programs, such as programs having surround sound or other channel audio of MPEG-2 format, from an MPEG-2 signal that has been encoded for backward compatibility with MPEG-1 stereo audio systems.

It is a particular objective of the present invention to provide such multichannel decoding without involving large amounts of on-chip memory or SRAM and without imposing long delays on the decoding process.

According to the principles of the present invention, a method and apparatus are provided by which one or more channels of a multiple channel audio program are effectively and efficiently decoded, each from the data streams of a plurality of the encoded channels of an audio program stream, particularly where an entire audio frame of data of one audio channel is received before data of another channel of the same frame is received for decoding. More particularly, there are provided a method and an apparatus for the decoding of digital audio data from data received, whether from a broadcast signal, from a storage medium or otherwise, parsed and stored in a buffer memory in a parsed or reconstructed form, preferably still compressed. The stored reconstructed data is subsequently read from the buffer memory, one parsed portion of a frame at a time, and decoded in accordance with a selected one of a plurality of decoding processes to produce audio output signals of the plurality of audio channels.

In the preferred embodiment of the invention, the data of one or more channels of an audio frame is received and sequentially parsed and stored at spaced intervals in segments of buffer memory, such as DRAM which is provided external to a hardware processing chip that contains the decoder or decoding logic. Then, the data of a subsequently received channel or channels are received, parsed and stored by interleaving corresponding data of the subsequently received channel or channels with the previously stored segments of data of the previously received channel or channels. Then, when a quantity, such as a frame, of the data of multiple channels have been so parsed and stored in the buffer memory, the data are sequentially read from the memory by a decoder, decoded and then output to an audio presentation device.

Preferably, audio data of two channels that may represent a two channel stereo program are first received, parsed and stored in spaced apart locations in the buffer memory. Typically, the buffering of the data of the first two channels occurs before the decoder knows what data, if any, of additional channels will be received. Then coding information of the additional channels, if any, is received and interpreted to determine the nature of the additional channel data, if any, will be received and the decoding process to be employed. If the incoming data stream is interpreted to contain data of additional channels, for example, additional MPEG-2 surround-sound channels, that data, when received, are parsed and stored in the buffer at intervals between the spaced apart locations of previously stored data. The receipt of the additional channel data is typically received and stored after the receipt of the coding data that specifies the decoding process.

The sequential decoding of information that has been stored in the buffer is carried out according to the information of the specified decoding process read from a header portion of the incoming bit stream. Optionally, the parsing and storing of the data of the additional channels into the buffer are in response to the decoding process information. This decoding can take the form of a 2×2 matrix transformation, where the program is interpreted as being a two channel stereo program, for example, or a 5×5 matrix transformation, where the program is interpreted as being a surround-sound program. The transformation will typically involve a frequency domain to time domain transformation by which the audio output of each channel is reconstructed from incoming data from a plurality of channels. The audio data may be stored in the buffer in an at least partially compressed or encoded form, and preferably in a completely compressed and encoded form. So compressed, the data can be buffered in 16-bit samples, where fully decoded and decompressed audio time domain samples may occupy a larger space of, for example, 24 bits.

In certain embodiments of the invention, the definition and configuration of the reproduced audio channels occurs in response to a determination of the configuration of audio reproduction equipment of the receiving system. For example, a multiple channel signal may be differently decoded into output for one channel monoral, two channel stereo, multi-channel surround or some other combination of channels, depending on the configuration of the audio presentation system associated with the decoder.

The preferred embodiment of the invention makes use of a memory controller in an integrated audio and video decoder which is capable of reading and writing from and to buffer memory in other than a sequential fashion. The memory controller allows the decoding circuits and their algorithms to access non-contiguous areas of memory and to read and write differing sizes of data blocks. The preferred embodiment of the invention also provides a segmentation of the decoding algorithm to reduce both on-chip memory (SRAM) and off-chip or buffer memory (DRAM) that is required in the decoding of MPEG-2 Layer II multichannel audio particularly, and also provides savings in DRAM use when decoding MPEG-1 Layer I and Layer II stereo audio.

In a specific embodiment of the invention, an integrated circuit audio decoder reads an MPEG-2 Layer II multichannel data stream and decodes and stores all of the information defining the format of the coded samples for channels 1 and 2, particularly the header, the error check information if present, and allocation "scfsi" and scalefactor values as defined in the MPEG standards. The decoder reads data samples for channels 1 and 2 in subblocks of 96 samples per channel, storing each sample as a fixed length 16 bit sample. Since, in MPEG-1 and MPEG-2 Layer II coding, the data in the incoming bitstream would have been compressed into between 0 and 16 bits, the extraction of each sample of this data and its storage into a 16-bit space amounts to a partial, but only a partial, decompression.

More particularly, in Layer II MPEG-2 audio, subblocks of 96 fixed 16-bit samples per channel amount to a total of 3072 bits that include both channels 1 & 2. These samples are written into external memory under the control of a memory controller, with every fourth subblock, starting from the first subblock, being preceded by a subblock containing a 3072-bit decoded header of identifying, allocation and scale factor information for channels 1 and 2. Following each 3072-bit subblock of channel 1 and 2 data, whether it be a subblock of header information or partially decoded sample data, the memory controller causes a gap of 4608 bits to be reserved in the DRAM buffer. When the audio decoder has processed all of the coded samples for channels 1 and 2 for an entire audio frame, which is 1152 samples per channel for a Layer II bitstream, 12 memory subblocks of coded samples will have been produced with three header subblocks interspersed, one preceding each four subblocks of channel 1 & 2 data.

After the audio decoder has processed, parsed and stored the channel 1 and 2 samples for an audio frame, the audio decoder performs a similar operation for the MPEG-2 information for channels 3–5, if present. The audio decoder extracts header information and produces header subblocks, and reads, parses and stores partially decoded sample blocks for channels 3–5. The 4608 bits, which each contains 96 samples of each of the three channels 3–5, when written into external memory in the spaces left between the previously written blocks relating to channels 1 and 2, fills a 7680-bit subblock with data for all of the channels. As a result, each subblock of not more than about 8K of memory contains all of the data needed by the decoder to decode three time samples, of 32 frequency domain samples each, needed to produce simultaneous fully transformed and decoded output signals for all of the channels of audio. The coded information for the LFE channel, where present, is placed into the last sample location in each block, overwriting a sample for channel 5, which, due to the nature of the MPEG Layer II algorithm, is always zero. Thus, full six channel (or 5.1 channel) audio can be reproduced.

The preferred embodiment of the invention produces a sequential array in external memory of three sub-frames, each containing a header block, the first part of which relates to channels 1 and 2 and the second part of which relates to channels 3–5, followed by four subblocks containing 96 (3×32) interleaved samples each of channel 1 and 2 coded data and 96 (3×32) interleaved samples each of channel 3–5 coded data. In this form, the audio decoder then is able to reread the stored information from the external memory or buffer in a linear order, only needing information from one header subblock and one subblock of partially decoded audio data in order to decode and output audio for all 5.1 channels. This operation gives a saving of internal or on-chip memory (SRAM). Also, since partially decoded samples are written to external buffer memory as 16 bits rather than full decoded samples of up to 24 bits, a saving in external memory use of about 30% is obtained, including the overhead that is lost due to the writing of the header block to memory, while no loss in the accuracy of the decoded audio results.

Methods of the invention are also applicable to MPEG-1 stereo Layer II coded streams with an alternative placement of the successive header and sample blocks for channels 1 and 2 in DRAM being contiguous, that is, with gaps for storage of samples for channels 3–5 being omitted. This provides a saving in DRAM of about 17%. Furthermore, the methods of the invention are also applicable to MPEG-1, Layer I bitstreams. In MPEG-1, Layer I, a simpler coding scheme than, and is essentially a subset of, the Layer II scheme discussed above. In effect, the partial decoding process of the preferred embodiment of the invention removes from the Layer II coded audio many of the features that distinguish it from Layer I. As such, Layer I coded audio can also be partially decoded to produce data in DRAM that can be processed identically to Layer II stereo data. There will be the difference that the 384 samples per channel Layer I frames are ⅓rd the size of 1152 samples per channel Layer II frames, which means that the header in the data stream of a Layer I stream will occur three times as often as the header in a Layer II stream. Since, according to the preferred embodiment of the invention, a header is inserted into memory three times for each Layer II frame, rather than just once, an identical DRAM image can be produced from Layer I and Layer II streams. As a result, as the audio decoder converts data from DRAM into reconstructed audio samples, it does not need to know whether the stored information being processed from each contiguous four block section of DRAM represents a whole frame from a Layer I stream or ⅓rd of a frame from a Layer II stream. This also saves about 17% of DRAM for the processing of MPEG-1, Layer I streams. Further, the parsing scheme of the preferred embodiment of the invention provides the benefit at the system level by producing a single virtual frame size of 384 samples per channel, regardless of whether the input is Layer I or Layer II, which can simplify other operations such as video/audio synchronization.

In addition, in those applications where the audio decoder cannot be told by the controller at the system level whether the incoming data stream is MPEG-1 or MPEG-2 , The decoder of the preferred embodiment of the invention detects the MPEG standard of the incoming stream from the data stream itself. The decoder proceeds to read, partially decode and store in DRAM the information relating to channels 1 and 2, parsed in sequential blocks in which are provided the spaces for receiving information relating to channels 3–5. Then, if upon reading the ancillary data field, the stream is discovered to be MPEG-1 because the ancillary data field does not contain an MPEG-2 header or any other information on channels 3–5, a specially marked header block for channels 3–5 is written into the gaps in DRAM that were provided for the channel 3–5 header data. Then, blocks of zeros are written into the gaps provided for the channel 3–5 sample data instead of the partially decoded sample data for channels 3–5. The decoder, when executing the process that reads the DRAM, recognizes the special header blocks and processes the DRAM contents as MPEG-1 stereo data rather than MPEG-2 multichannel data, skipping the blocks of zeros. Since the process that reads the incoming data stream can also put different marks in the header blocks for channels 1 and 2 according to whether it is expected to decode a full MPEG-2 data stream or just an MPEG-1 stream, the process that reads from DRAM can act entirely on the data it reads from DRAM without needing other inputs from the data stream handling process.

These and other objectives and advantages of the present invention will be more readily apparent from the following detailed description of the drawings of the preferred embodiment of the invention, in which:

DETAILED DESCRIPTION OF THE PREFERRED EMBODIMENTS

Figure 3:
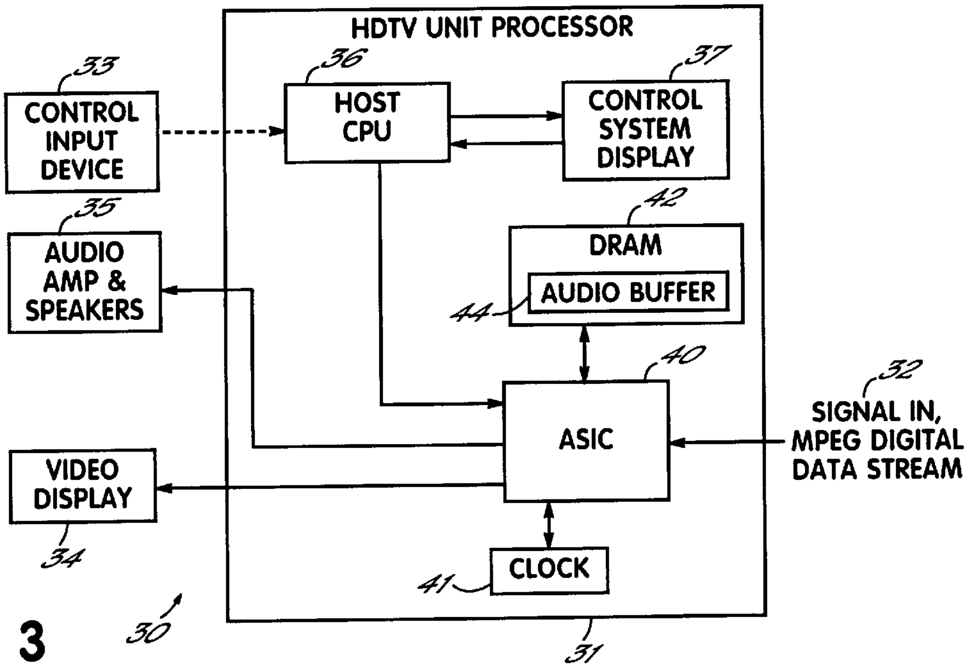
FIG. 3 is a block diagram representing an MPEG-2 receiver embodying principles of the present invention.

One embodiment of the present invention is for use in digital television (DTV). FIG. 3 diagrammatically represents a DTV receiving and audio and video presentation system 30, which includes a signal processor and controller unit 31 having a program signal input 32 in the form of an antenna, a cable or other medium through which an MPEG-2 digital input signal is received, a control input from a control input device 33 through which a user makes program and presentation format selections, which may include interactive communications, a video output which connects to a video display or video presentation subsystem 34, and an audio output which connects to an audio amplifier and speaker system or audio presentation subsystem 35. The unit processor 31 includes a central processing unit or host CPU 36 which is programmed to process user commands from the control input device 33 and to operate a control system display 37, which displays information, menu selections and other information to the user and which may or may not also function as an input device. The unit processor 31 also includes an Application Specific Integrated Circuit or ASIC 40, which, when provided with configuration and selection information by the host CPU 36, decodes the raw signal from signal input 32 for output to the video and audio presentation devices 34 and 35. The unit processor 31 further includes a local system clock 41, which connects preferably to the ASIC 40, and a buffer memory 42. The buffer memory 42 is preferably in-line, sequential memory, such as dynamic random access or DRAM memory, and preferably includes a contiguous variable length audio decoder buffer or register 44 for use by the ASIC 40 for audio signal processing.

Figure 4:
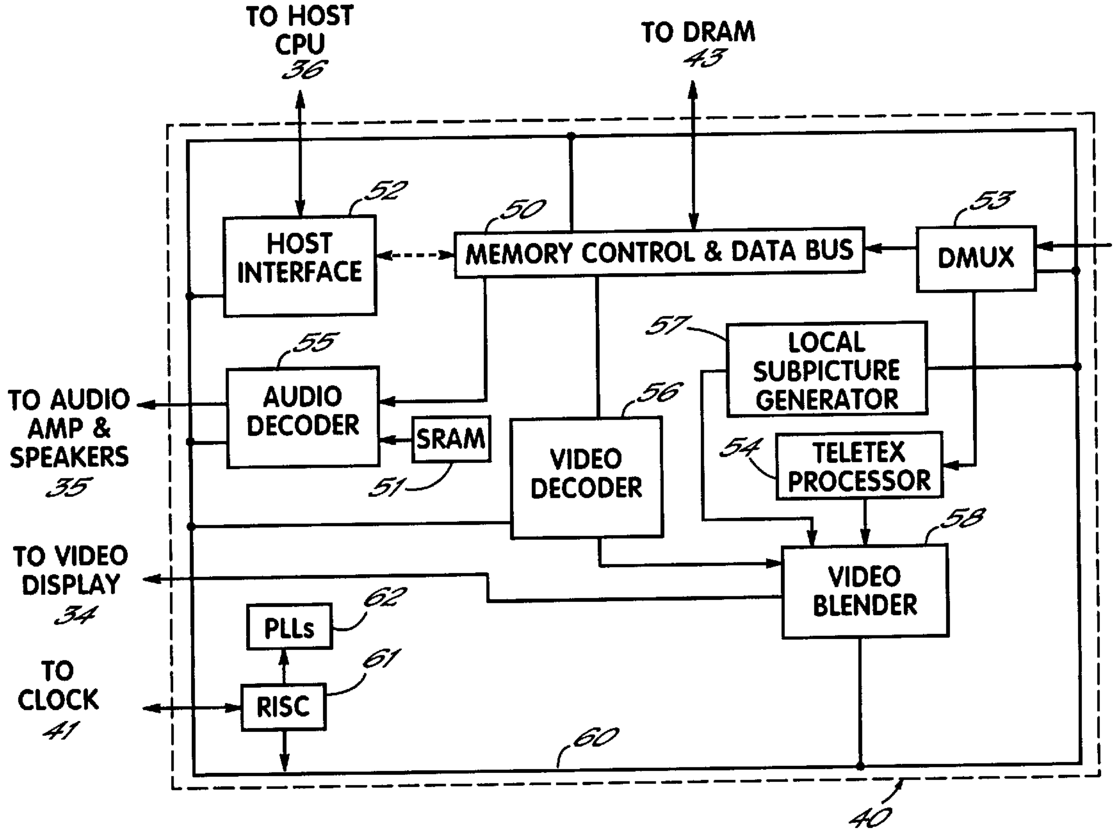
FIG. 4 is a block diagram representing the ASIC portion of the receiver of FIG. 3.

FIG. 4 diagrammatically illustrates the configuration of the ASIC 40. The ASIC 40 is a single integrated circuit chip that is logically divided into a number of components or functions. The ASIC 40 includes a memory control and data bus 50, which has at least three two-way data flow connections to a static random access memory or SRAM 51, to a host interface unit 52 which connects externally with the host CPU 36, and externally with the DRAM memory module 43. The SRAM 51, while diagrammatically illustrated as a single discrete box in FIG. 4, is actually several blocks of dedicated memory distributed among the various circuits of the ASIC 40, particularly in the decoders 55 and 56. The ASIC 40 includes a demultiplexer or DMUX 53 which has an input connected to the signal input 32 of the unit processor 31 and an output connected to the bus 50. The DMUX 53 has a text output connected to a teletex processor 54, that is also provided on the ASIC 40 for processing textual information such as closed caption script and other such data. The unit processor 40 further includes an audio decoder 55, a video decoder 56 and a local subpicture generating unit 57. The audio decoder 55 has an input connected to the bus 50 and an output connected externally of the unit processor 35 to audio presentation subsystem 35. The video decoder 56 receives video program data via an input from bus 50, decodes it, and sends the decoded video picture data back through bus 50 to a video buffer 48 not shown in the DRAM memory 42. The subpicture generating unit 57 generates local picture information that includes control menus, display bar-graphs and other indicia used in control interaction with the user. A blender 58 is provided which combines the local video from the subpicture unit 57 with teletex information from the teletex processor 54, and with received video program, which has been decoded and stored in video buffer 48, via an input connected to the bus 50. The output of the blender 58 is connected externally of the unit processor 31 to the video presentation subsystem 34.

The ASIC 40 is provided with a control bus 60 to which a control port of each of the components 50–57 of the ASIC is connected. The ASIC 40 is also provided with a Reduced Instruction Set Controller or RISC 61, which serves as the local CPU of the ASIC 40. The RISC 61 controls the functions of the components 50–57 of the ASIC 40 through control data ports connected to the control bus 60. The RISC 61 has a clock input that connects externally of the ASIC 40 to the local system clock 41, and has another input connected to phase locked loop circuitry or PLLs 62 within the ASIC 40 used to time internal clock signals.

Figure 5:
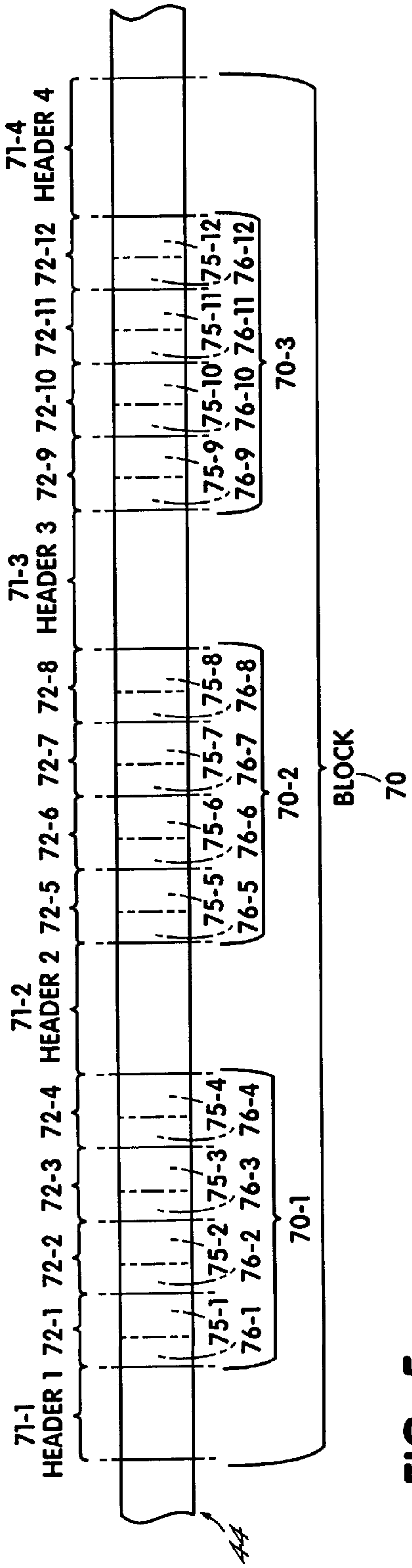
FIG. 5 is a memory map in accordance with one preferred form of the method of the present invention utilizing the receiver embodiment of FIGS. 1 and 2.

According to the preferred embodiment of the invention, the RISC 61 includes programming to control the DMUX 53 and bus 50 to manage the memory and to control the audio decoder 55 in conjunction with the memory management to identify the audio frames 11 and 21 of MPEG-1 and MPEG-2 program streams 10 and 20 to parse the incoming compressed audio data 13,14, and 23–25 for five or six audio channels, and to write this audio data in a new format into the audio decoder buffer 44. Preferably, when a program stream 10 or 20 is received via the input 32 and the audio portion 11 or 21 is identified, and after control information from audio header field 12 is read, decoded and stored in SRAM 52, the interleaved pairs of samples of compressed audio data 13,14 representing channel 1 and channel 2 are identified. Then the data is demultiplexed by the DMUX 53 and routed through the bus 50 and to the audio decoder buffer 44 in DRAM module 42, where it is stored in a frame size memory block 70, as illustrated in FIG. 5.

The incoming audio data stream for MPEG Layer II for example, contains the 1152 sample per channel. The samples represent 36 time slices of data transformed into 32 frequency band components. The data for the two channels 1 and 2 of stereo are interleaved such that the data is in 1152 variable length sample pairs. The 1152 pairs of the frame of data of channel 1 and channel 2 audio is sequentially divided into preferably twelve parts or sub-blocks 76-1 through 76-12. The block may be divided into other than twelve sub-blocks, with the preferred number being in the range of from four to thirty-six sub-blocks for MPEG-1 and MPEG-2 audio. Each of the sub-blocks of channel 1 and 2 audio thereby contains 96 sample pairs including three time slices of 32 bands each. Each sample is stored as fixed-length 16-bit data in a portion of a sub-block 76 that includes 3072 bits of storage space (3 time samples×32 bands×2 channels×16 bits) of channel 1 and channel 2 data. These data are stored at intervals spaced apart by 4608 bits to allow storage twelve corresponding 4608 bit storage spaces 75-1 through 75-12 to allow for the storage of similar data for the three channels 3–5.

Figure 6:
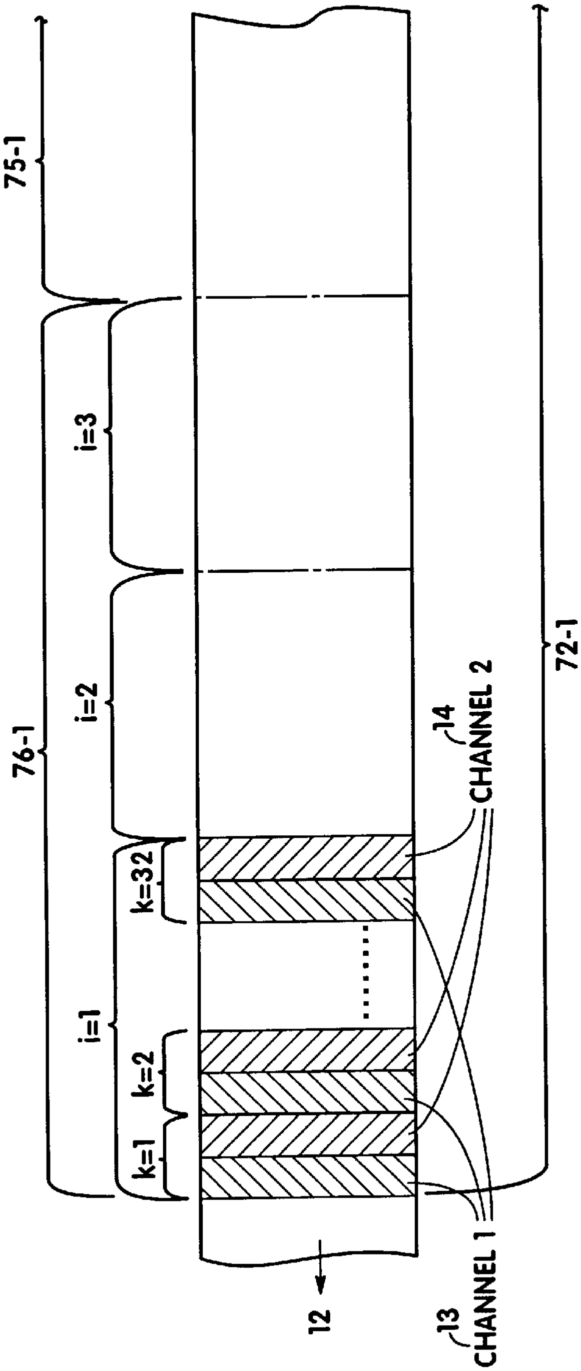
FIG. 6 is an enlarged memory map diagram illustrating a portion of the diagram of FIG. 5.

Each of the sub-blocks 76-1 through 76-12 contains the 96 pairs of interleaved fixed length 16 bit samples of channel 1 and channel 2 data, as illustrated in FIG. 6. The 96 pairs include 32 frequency domain samples k each taken at 3 time intervals i. For convenience, all of the channel 1 samples for each of the respective sub-blocks 76-1 through 76-12 are collectively referred to as samples 73-1 through 73-12, and all of the channel 2 samples for each of the respective sub-blocks 72-1 through 72-12 are collectively referred to as samples 74-1 through 74-12.

Figure 6A:
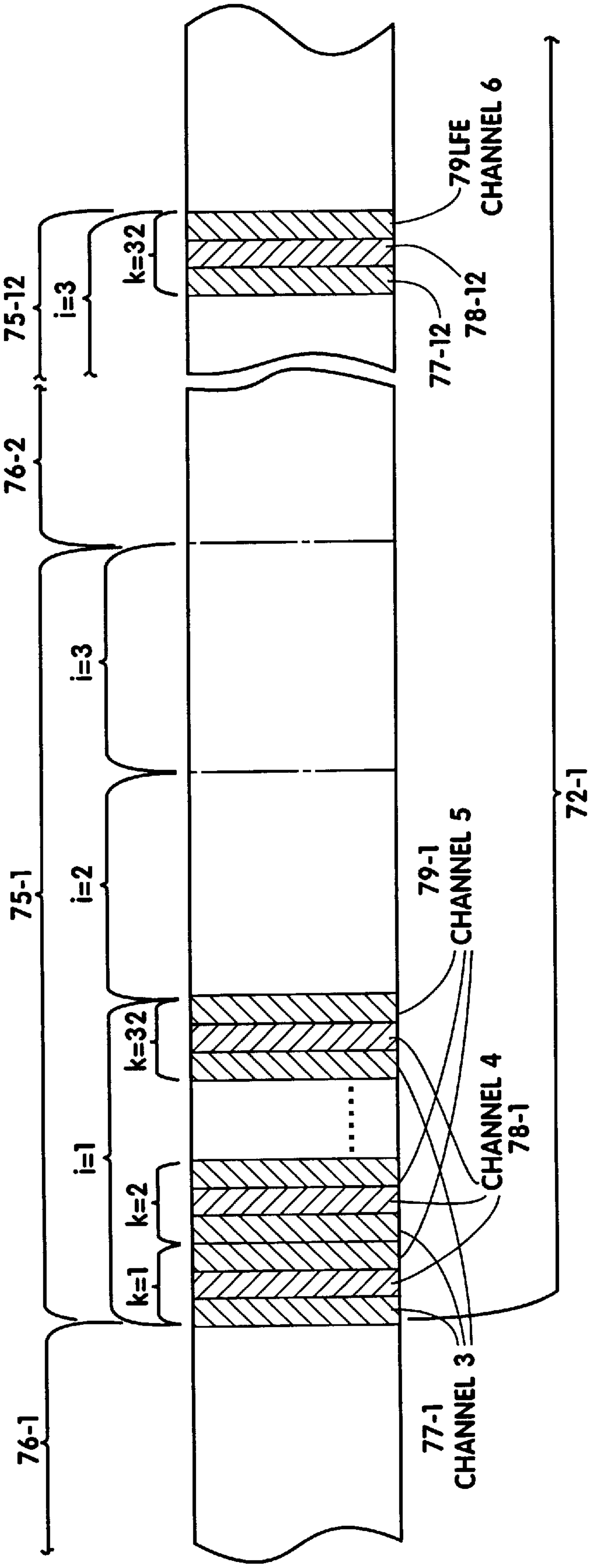
FIG. 6A is an enlarged memory map diagram, similar to FIG. 6, illustrating another portion of the diagram of FIG. 5.

After an entire frame of audio for channels 1 and 2 have been received, parsed and stored in the sub-blocks 72 of the block 70 in the buffer 44, the audio for the additional channels, if present in the ancillary data field, is received, parsed and stored in the 4608-bit storage spaces 75-1 through 75-12 of the sub-blocks 72-1 through 72-12. The 96 interleaved fixed length 16-bit samples of the audio for the three channels 3–5 are designated as samples 77-1,78-1,79-1 through 77-12,78-12,79-12. These channel 3–5 data are thereby grouped in 1/12th frame bundles adjacent the corresponding data from samples 73-1,74-1 through 73-12,74-12 for channels 1 and 2, as illustrated in FIG. 6A. Data for the Low Frequency Effects channel, channel 6, where present, overwrites the channel 5 data of the last sample of each sub-block, 79-1 through 79-12, for the sample i=3, k=32.

In addition, three identifying fields of data 71-1 through 71-3 are generated and written to the buffer 44, marking the beginning of a data block 70 as well as at two intermediate points in the buffer 44, dividing the data in the block 70 of the buffer 44 into three segments 70-1 through 70-3 one following each of the identifying or header fields 71-1 to 71-3. When an audio frame 11 or 21 is received, information from the heater 12, which relates to the first channels 1 and 2, is written into a first part 81-1 to 81-3 not shown of each of the header fields 71-1 to 71-3, respectively. Then, when the ancillary data portion 15 of the frame is received, identifying data relating to the additional channels 3–5 or 3–6 is written into a second part 82-1 to 82-3 of each of the header fields 71-1 to 71-3.

After an entire frame of audio has been received, parsed and stored in the buffer 44 in the manner described above, the data can be retrieved onto the bus 50 to be read and decoded by the audio decoder 55. Only a small amount of data need be read from the DRAM buffer 44 at any one time. For example, the first sub-block 72-1 can be placed in the SRAM 51 for audio decoding. The data from this sub-block will include three time domain sample sets each of the 32 frequency samples of each of the five channels, which are the data 73-1, 74-1, 77-1, 78-1 and 79-1.

The audio decoder 55 reads the data from the buffer 44, when the data is needed for output to the audio presentation system 35, and decodes it by performing the frequency to time domain transform to convert the data to a series of values for output. In making the conversion, channel 1 data is produced along with channel 2 data, which might include a copying of some data from channel 1. When five or six channel MPEG-2 audio is being decoded, the transformation also includes the production of audio output data for channels 3–5 and, when present, channel 6 the LFE channel. The production of the data for any or all of channels 3–6 may include the copying of data from channels 1, channel 2 or any other of the channels.

Because the sub-block 72 includes all of the data needed to perform the transform and completely generate a sequence of output signals for simultaneous output to all of the channels, only a fraction of an audio frame of data need be read by the audio decoder 55 and placed into SRAM 51. Further, the data needed can be read from a relatively small area of contiguous memory, particularly memory of the size of a 1/12th frame block 72. Furthermore, once decoded, the decoded audio is metered to the output device 35 in the proper presentation order and in accordance with the presentation timing. In DTV systems, the audio is output so as to be in synchronization with the video.

Figure 1:
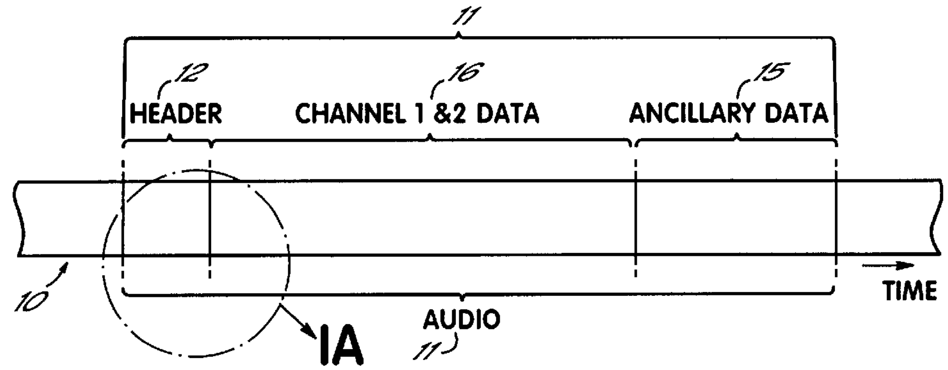
FIG. 1 is a diagrammatic representation of the format of a bitstream in accordance with the MPEG-1 audio standard.
Figure 1A:
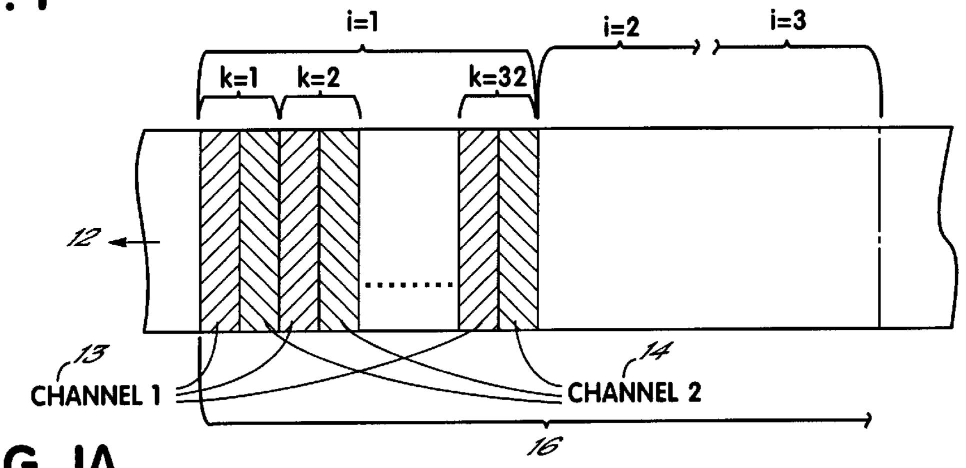
FIG. 1A is an enlargement of the circled portion 1A of FIG. 1.

The audio, parsed and stored as described above, is advantageous in various situations. For example, the audio decoder 55 is configured to operate under the control of the RISC 61 so that, if the program is an MPEG-1 program that is received in the form illustrated in FIG. 1, and if the audio presentation subsystem 35 is a two channel stereo audio system, two stereo channels of left and right stereo sound will be delivered to the audio presentation sub-system 35. In some audio formats, the two stereo channels are encoded in separate left and right stereo channels, in which case the stored data in buffer 44 are sequentially read by the audio decoder 55, when instructed to do so by the RISC 61 or in response to a comparison of clock output with coding embedded in the data, from the beginning of the block 70 in the buffer 44, decoded, and sent, again when instructed to do so by the RISC or in response to embedded coding and clock output, to the audio output and sound reproduction system 35. If, however, a matrix transformation is required, the transformation is performed on the data being read sequentially from the register 44, and the transformed data is sent to the output to sound system 35. In performing the matrix transform, the processor 55 reconstructs channels one and two, and also channels three through five by copying missing information from channel one, or, if it were required, from the other channels as well, according to a 5×5 inverse transformation matrix, as required by the coding process.

Figure 2:
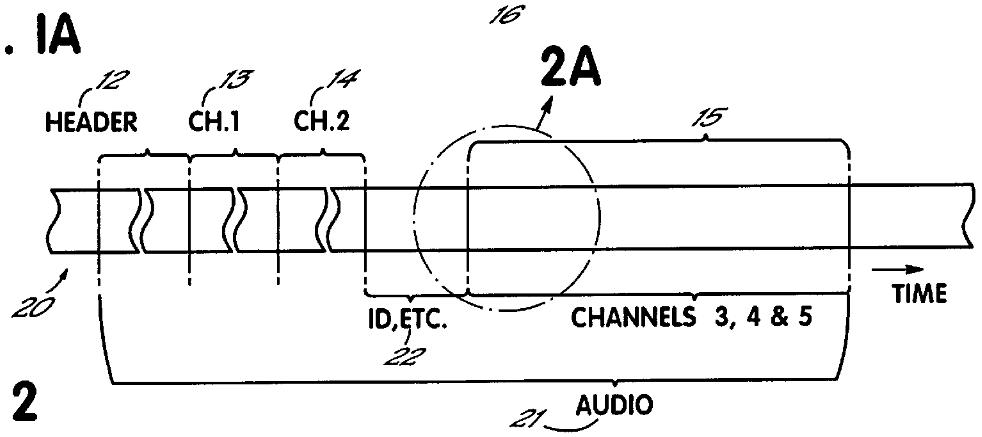
FIG. 2 is a diagram, similar to FIG. 1, representing the format of a bitstream in accordance with the MPEG-2 audio standard.
Figure 2A:
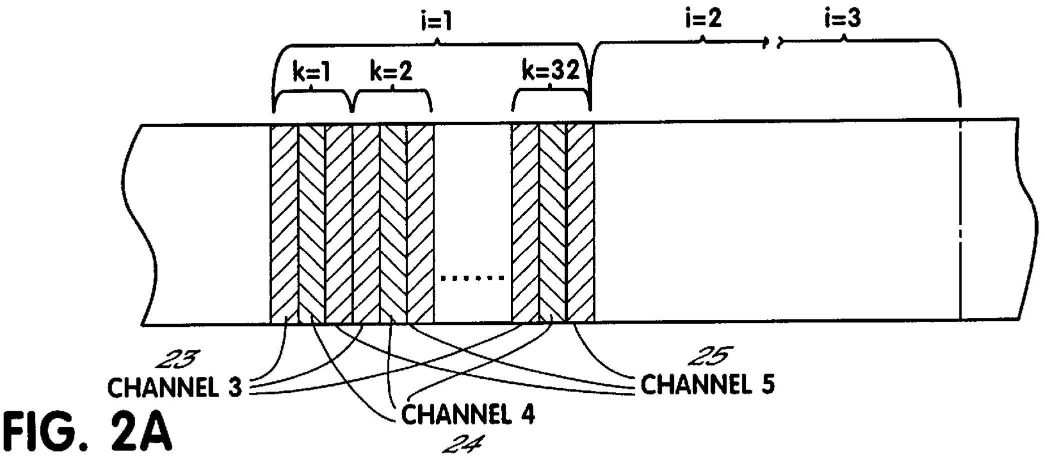
FIG. 2A is an enlargement of the circled portion 2A of FIG. 2.

When a program is an MPEG-2 program having multichannel audio, such as, for example, surround sound audio, the additional three channels 3–5 of data, 23, 24 and 25, are included in the audio portion 11 of the program stream 10, as described in connection with FIG. 2 above. With this backward compatible MPEG-2 program, the format of the data for the channels 3 through 5 will not be known, and the decoding process for the data will not be known, until after the data fields 13 and 14 for channels one and two have been received by the decoder. This is because the coding information for the MPEG-2 channels is located in the coding information and ID field 22 at the beginning of the ancillary data field 15 of the MPEG-1 audio frame stream, which follows the data 13 and 14 for channels 1 and 2.

Nonetheless, according to the preferred embodiment of the present invention, the data 13 and 14 for channels 1 and 2 is parsed and stored in the buffer 44 in the same way regardless of whether the signal is an MPEG-1 or MPEG-2 signal. The decoder 55 can therefor read and interpret the coding information from the ancillary data field 15 to determine whether it contains the MPEG 2 coding data field 22 information in the header field 71, determines whether channel 3–5 data is contained in the sub-block portions 75, and if so processes the channel 3–5 data. If the program is of MPEG-1 format, the remaining spaces 75-1 through 75-12 following sub-blocks 76-1 through 76-12 in the buffer 44 will have been filled with zeros, and the header information in fields 71-1 through 71-4 would be marked to tell the decoder that two channel stereo is to be output to the audio presentation system 35.

Those skilled in the art will appreciate that there are many uses of the present invention, and that the invention is described herein only in its preferred embodiments. Accordingly, additions and modifications can be made without departing from the principles of the invention. Therefore, the following is claimed:

What is claimed is:

1. A multichannel digital audio decoding method comprising the steps of:

sequentially receiving, from an audio program bitstream, a first stream of digital audio data representing an audio frame of at least one coded audio channel, and sequentially parsing the data from the first stream, with an integrated circuit processor, into a plurality of more than two sequential segments and sequentially storing each of the segments in a first portion of each of a corresponding plurality of subblocks in a block of buffer memory external to the processor; then receiving, from the audio program bitstream, a stream of digital format data relating to the structure of data of one or more additional channels of the audio frame, and decoding the digital format data with the processor; then sequentially receiving, from the audio program bitstream, a second stream of digital audio data representing data of the one or more additional channels of the audio frame, and in accordance with information from digital format data, sequentially parsing the data from the second stream, with the integrated circuit processor, into the plurality of more than two sequential segments and sequentially storing each of the segments of the parsed data from the second stream in a second portion, contiguous with the first portion, of each of the plurality of subblocks in the block of buffer memory;

after data from the second stream has been stored in the buffer memory, sequentially reading subblocks of the stored parsed data from the buffer memory, subblock by subblock, to produce a plurality of output signals containing information for reproducing audio for a plurality of decoded audio channels from data received from the first and second streams of the audio frame.

2. The method of claim 1 wherein:

the digital format data decoding step includes the step of storing the decoded information in a subblock of the buffer memory.

3. The method of claim 2 wherein:

the digital format data decoding step includes the step of storing the decoded information in a plurality of subblocks of the buffer memory, with adjacent pairs of such subblocks having a plurality of segments of the first data stored in subblocks therebetween.

4. The method of claim 1 wherein, following the receiving steps and the parsing and storing steps:

sequentially receiving, from the audio program bitstream, a first stream of digital audio data representing a second audio frame of at least one coded audio channel, and sequentially parsing the data from the first stream of the second audio frame, with an integrated circuit processor, into a plurality of more than two sequential segments and sequentially storing each of the segments in a first portion of each of a corresponding plurality of subblocks in a second block of buffer memory external to the processor; then receiving, from the audio program bitstream, a stream of digital format data relating to the structure of data of one or more additional channels of the second audio frame, and decoding the digital format data of the second audio frame with the processor; then sequentially receiving, from the audio program bitstream, a second stream of digital audio data representing data of the one or more additional channels of the second audio frame, and in accordance with information from digital format data, sequentially parsing the data from the second stream of the second audio frame, with the integrated circuit processor, into the plurality of more than two sequential segments and sequentially storing the each of the segments of the parsed data from the second stream in a second portion, contiguous with the first portion, of each of the plurality of subblocks of the second block of buffer memory.

5. The method of claim 1 wherein:

the storing steps include the steps of storing the respective data in the block of buffer memory in an at least partially coded and compressed form; and the reading step includes the step of decoding and decompressing the subblocks of the stored parsed data.

6. The method of claim 1 wherein:

the buffer memory is DRAM and the reading step includes the step of reading the data from the DRAM into local SRAM on a chip containing the integrated circuit processor.

7. The method of claim 1 wherein:

the step of reading subblocks of the stored parsed data from the buffer memory, includes the step of performing a matrix transformation on data of a plurality of channels including channels from each of the first and second streams to produce a plurality of output signals containing information for reproducing audio for the plurality of decoded audio channels.

8. The method of claim 1 wherein:

the method includes the step of further determining, with the processor in response to information from a host system that includes an audio presentation system and is associated with the processor, the channel configuration of the audio presentation system; and the step of reading subblocks of the stored parsed data from the buffer memory, includes the step of producing the plurality of output signals in accordance with the determined configuration.

9. The method of claim 1 wherein:

the storing and reading steps include the steps of accessing non-contiguous areas of the buffer memory and reading or writing differing sizes of data blocks.

10. The method of claim 1 wherein:

the step of sequentially receiving a first stream includes the step of sequentially receiving samples of compressed digital audio data representing an audio frame of channels one and two of an MPEG audio program, and the step of sequentially parsing the data from the first stream includes the step of sequentially parsing the data into a plurality of from four to thirty-six sequential segments and sequentially storing the segments in the first portion of each of the corresponding plurality of the subblocks; and the step of receiving a stream of digital format data includes the step of receiving format data relating to the data structure of the channels of the audio frame and storing information from the format data in at least one subblock in the buffer memory;

the step of sequentially receiving a second stream of digital audio data includes the step of receiving data representing additional channels three through five of an MPEG-2 audio program, and the step of sequentially parsing the data from the second stream includes the step of parsing, in accordance with information from digital format data, sequentially parsing the data from the second stream into the plurality of sequential segments and sequentially storing the segments of the parsed data from the second stream in the second portion of each of the plurality of subblocks in the buffer memory;

the step of sequentially reading subblocks of the stored parsed data includes the step of, after data from the second stream has been stored in the buffer memory, sequentially reading subblocks of the stored parsed data, subblock by subblock, to produce a plurality of output signals containing information for reproducing audio for a plurality of channels from data received from the first and second streams of the audio frame.

11. The method of claim 10 wherein:

the method includes the step of, before receiving the first stream, receiving and decoding information defining the format of coded samples of coded MPEG channel 1 and 2 data; and the step receiving digital format data relating to the structure of data of the one or more additional channels of the audio frame includes the step of receiving information defining the format of coded samples of coded MPEG-2 channel 3, 4 and 5 data.

12. The method of claim 10 wherein:

the storing steps include the step storing each of the segments in a subblocks containing not more than approximately 8K-bits in the block of buffer memory.

13. The method of claim 10 wherein the method further comprises the steps of:

determining whether the received audio program bitstream contains MPEG-1 audio and determining whether the received audio program bitstream contains MPEG-2 audio; and if the program bitstream contains MPEG-2 audio, the storing steps include the steps of storing segments of one audio frame in the block of buffer memory; and if the program bitstream contains MPEG-1 audio, the storing steps include the steps of storing segments of three audio frames the block of buffer memory.

14. A multi-channel audio receiver comprising a buffer memory and an application specific integrated processor programmed according to the method of any of claims 1 to 13.

15. A digital television receiver comprising the multi-channel audio receiver of claim 14.

16. A multichannel digital audio decoding method comprising the steps of:

providing an integrated circuit processor;

providing a local random access memory;

providing a sequential random access memory buffer;

sequentially receiving a bitstream containing digital audio data representing sound of a plurality of channels, the receiving step including the substeps of:

sequentially receiving a first data stream containing data of at least one of the channels of the plurality, then sequentially parsing data from the first data stream and storing the parsed data in a corresponding sequence in a plurality of blocks in the sequential memory buffer, with first received data of the first data stream being stored in a first one of the blocks and second received data of the first data stream being stored in a second one of the blocks, then sequentially receiving a second data stream containing data of at least a second one of the channels of the plurality, and then sequentially parsing data from the second data stream and storing the parsed data in the corresponding sequence into the plurality of blocks in the sequential memory buffer, with first received data of the second data stream being stored in the first one of the blocks and second received data of the second data stream being stored in the second one of the blocks;

then sequentially decoding the stored parsed data, block by block, to produce a plurality of output signals containing information for reproducing the sound of each of the plurality of channels, the decoding step including the substeps of:

transferring data from the first one of the blocks into the local memory, then calculating with the processor the data from the first one of the blocks and thereby generating a first sequential portion of the output signals for reproduction of sound of the first and the second channels, then transferring data from the second one of the blocks into the local memory, and then calculating with the processor the data from the second one of the blocks and thereby generating a second sequential portion of the output signals for reproduction of sound of the first and the second channels.

17. A digital audio reproducing system comprising:

an audio output subsystem;

an application specific integrated circuit having an input for receiving a program bitstream that includes digital audio and an output connected to the audio output subsystem;

a sequential random access buffer memory external to the application specific integrated circuit;

the application specific integrated circuit including audio decoder circuitry, local random access memory in communication with the decoder circuitry, and a memory controller and a memory bus connected to the decoder circuitry and to the buffer memory;

the buffer memory being configured, by programming in the memory controller, to store interleaved samples of multiple coded channels from each frame of received audio in from four to thirty-six subblocks;

the decoder being programmed to read and decode data from each successive one of the sub-blocks by transforming the data of the coded channels stored in the sub-block into simultaneous decoded output of all of a plurality of decoded channels.

18. The system of claim 17 wherein:

each of the sub-blocks contains not more than approximately 8K-bits of digital memory.

19. The system of claim 17 wherein:

the memory controller is programmed or configured to store and read to and from non-contiguous areas of the buffer memory and to read and write different size blocks of data.

20. The system of claim 17 wherein the application specific integrated circuit is programmed to:

receive a first stream of data;

if the data of the first stream includes samples of compressed digital audio data representing an audio frame of channels one and two of an MPEG audio program, then to sequentially parse the data into a plurality of from four to thirty-six sequential segments and to sequentially store the segments in a first portion of each of a corresponding plurality of the subblocks; and thereafter to receive further data and, if such data is format data relating to the data structure of the channels of the audio frame and storing information from the format data in at least one subblock in the buffer memory, then to receive a second stream of digital audio data, and, if the received data of the second stream includes data representing additional channels three through five of an MPEG-2 audio program, then in accordance with information from digital format data, to sequentially parse the data from the second stream into the plurality of sequential segments and to sequentially store the segments of the parsed data from the second stream in the second portion of each of the plurality of subblocks in the buffer memory; and then to sequentially read subblocks of the stored parsed data after data from the second stream has been stored in the buffer memory, subblock by subblock, and to produce a plurality of output signals containing information for reproducing audio for a plurality of channels from data received from the first and second streams of the audio frame.

* * * * *